US008456729B2

(12) United States Patent
Brown et al.

(10) Patent No.: US 8,456,729 B2
(45) Date of Patent: Jun. 4, 2013

(54) WEATHER-RESPONSIVE SHADE CONTROL SYSTEM

(75) Inventors: Gordon Z. Brown, Eugene, OR (US); Tomoko C. Sekiguchi, Eugene, OR (US); Thomas D. Northcutt, Springfield, OR (US); Jeffrey A. Kline, Eugene, OR (US); Dylan M. Lamar, Portland, OR (US)

(73) Assignee: The State of Oregon Acting by and through the State Board of Higher Education on Behalf of the University of Oregon, Eugene, OR (US)

( * ) Notice: Subject to any disclaimer, the term of this patent is extended or adjusted under 35 U.S.C. 154(b) by 0 days.

(21) Appl. No.: 12/803,888

(22) Filed: Jul. 7, 2010

(65) Prior Publication Data

US 2011/0164304 A1 Jul. 7, 2011

(51) Int. Cl.
*G02F 1/153* (2006.01)

(52) U.S. Cl.
USPC .......................................................... 359/275

(58) Field of Classification Search
USPC .......................................................... 359/275
See application file for complete search history.

(56) References Cited

U.S. PATENT DOCUMENTS

| | | | | |
|---|---|---|---|---|
| 5,142,133 | A | 8/1992 | Kern et al. | |
| 5,237,169 | A * | 8/1993 | Grehant | 250/214 AL |
| 5,532,560 | A | 7/1996 | Element et al. | |
| 5,663,621 | A | 9/1997 | Popat | |
| 5,675,487 | A | 10/1997 | Patterson et al. | |
| 6,064,949 | A | 5/2000 | Werner et al. | |
| 6,084,231 | A * | 7/2000 | Popat | 250/214 AL |
| 7,111,952 | B2 | 9/2006 | Veskovic | |

* cited by examiner

*Primary Examiner* — James Jones
(74) *Attorney, Agent, or Firm* — Lumen Patent Firm

(57) ABSTRACT

An automatic daylighting method adjusts a window covering to block direct sunlight from entering the room through a window when the exterior sky condition is a sunny sky state and, subject to blocking direct sunlight, provides a desired daylighting interior light illuminance level and, if possible, a desired interior solar heat gain through the window. To prevent window covering oscillation, a delay may be used when the sky condition changes from a sunny to overcast state. The covering control may be based on various factors including interior light illuminance entering the window, a room heating or to cooling mode, whether the room is occupied by people, whether occupants have manually operated an adjustable window covering, and the exterior sky condition. The method may also detect an interior temperature level, e.g., to determine a heating or cooling mode of the room.

6 Claims, 8 Drawing Sheets

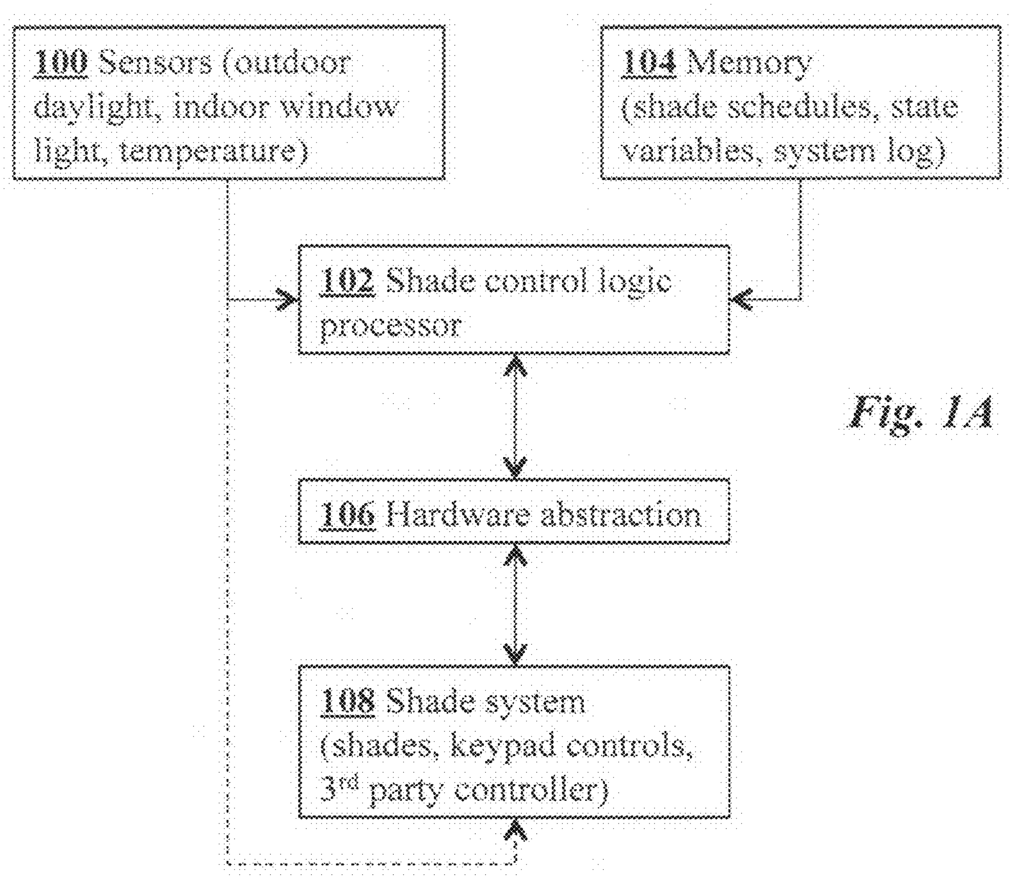
Fig. 1A
Fig. 1B
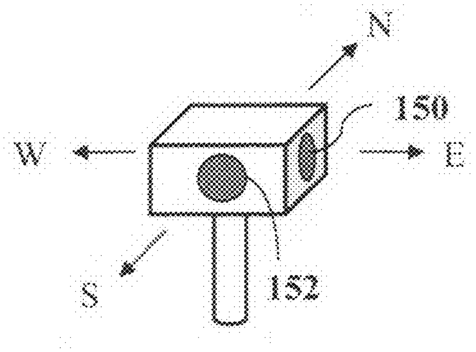

WEATHER-RESPONSIVE SHADE CONTROL SYSTEM

CROSS-REFERENCE TO RELATED APPLICATIONS

This application claims priority from U.S. Provisional Patent Application 61/270,413 filed Jul. 7, 2009, which is incorporated herein by reference.

FIELD OF THE INVENTION

The present invention relates generally to lighting and shading systems. More specifically, it relates to methods and systems for automatic interior daylighting systems.

BACKGROUND OF THE INVENTION

Existing shade control systems allow automated responses based on a time clock and solar position calculations. For example, U.S. Pat. No. 6,064,949 discloses a system for controlling the lighting in a room by adjusting a shade and interior lights based on time of day, position of the sun, orientation of the window, exterior light intensity, interior temperature, and presence of a person in the room in order to balance lighting and heating requirements. U.S. Pat. No. 5,237,169 discloses a device for controlling the lighting level of a room by adjusting a shade and an interior light dimmer. The shading and interior lighting are controlled in a specified order. In some variants, the system operates so as to maximize the use of daylighting and limit the consumption of energy. U.S. Pat. No. 5,663,621 discloses a system for automatic control of daylight admitted to a room, operating to block direct solar radiation while admitting substantial diffuse radiation based on detected external light as compared to predetermined thresholds and information about the window orientation, time, date, latitude and longitude. These existing shade control systems, however, are typically limited to simple optimization of just one or two desired parameters and often fail to reliably determine and respond to current sky conditions.

SUMMARY OF THE INVENTION

In one aspect, a method is provided for controlling one or more adjustable window covering devices (e.g., motorized window and/or skylight shade devices) to provide 1) optimum interior daylighting conditions, 2) limited direct sun glare, and 3) desired heat gain inside the building based on whether the building needs heating or cooling. Light sensors are used to determine whether the sky is cloudy or clear, and whether interior daylight illumination is within, above, or below a desired range. The method analyzes this data, and includes information regarding the position of the sun and which direction the window or skylight is facing, to adjust the window covering to block direct sun when necessary while maintaining interior daylight illumination within the desired range. The method works to maintain target interior daylight illumination levels. It does this by deciding whether the shade needs to let in more or less light, sending the appropriate command, and then testing the result (e.g., interior daylight illumination) on the next cycle. The system is designed to work independent of electric lighting systems and respond in such a way as to minimize the amount of electric lighting used when electric to lights are controlled by a daylighting system. Optionally, it can be integrated with electric lighting control systems. To control heat gain the system may determine whether heating or cooling is needed, using temperature sensors outside and inside the building. When heating is needed the window covering is adjusted to maximize solar gain while meeting glare criteria, and when cooling is needed the window coverings are adjusted to reduce solar gain.

In one aspect, a method is provided for automatic daylighting. The method includes detecting an interior light illuminance level primarily due to exterior light entering a window into a room, determining whether the room is in a heating or cooling mode, detecting whether the room is occupied by people, detecting whether occupants have manually operated an adjustable window covering for the window in the room, and detecting an exterior sky condition. Based on this information, the method calculates an adjustment of the adjustable window covering. The adjustment is calculated to satisfy the condition that the adjustable window covering is modulated to block direct sunlight from entering the room through the window when the exterior sky condition is a sunny sky state and the room is in a cooling mode. In addition, subject to satisfying the prior condition the adjustment is also calculated to provide, if possible, a desired daylighting interior light illuminance level through the window that is within a target daylighting range and provides, if possible, a desired interior solar heat gain through the window that is within a variable target heat gain range. The method then automatically adjusts the adjustable window covering based on the calculated adjustment. To prevent oscillation, the adjusting is delayed when the estimated exterior sky condition changes from a sunny sky state to an overcast sky state.

Preferably, the calculated adjustment is calculated in dependence upon the detected interior light illuminance level, the exterior sky condition, the determined heating mode, whether the room is occupied by people, and whether occupants have manually operated the adjustable window covering. The method may also detect an interior temperature level, e.g., to determine a heating or cooling mode of the room, and base the calculated adjustment on the interior temperature.

The adjustable window covering may be an interior motorized bottom-up roller shade mounted on the window or skylight. Preferably, the roller shade has a shade cloth which allows diffuse light transmission but not specular light transmission. Alternatively, the adjustable window covering may be any of various other coverings, including for example blinds, a variable emissivity coating or electrochromic glass.

The exterior sky condition may be determined, for example, by separately detecting four exterior light illuminance levels from four corresponding distinct directions, computing differentials between the four exterior light illuminance levels, and using logic to produce an estimate of the exterior sky condition.

The method enjoys the advantage that it can automatically and appropriately determine a desired combination of daylighting and solar gain while reducing the use of electric lighting and heating. In regards to daylighting and electric lights, daylighting is given precedence. The method for adjusting the window covering does not necessarily directly control the lighting: control of lighting may be left to an independent system that responds to changing interior illumination caused by the daylighting method. In regards to daylighting and solar gain, the amount of desired solar gain varies by season and climate location. The method will work in both heating and cooling modes by changing or scheduling the allowable illumination ranges. For instance, in winter time in a cold climate the system might be set to a heating mode to allow a greater amount of daylight in order to capture more solar gain.

The outputs of the system are not limited to adjustments of a window covering. The method may also be extended to control and adjust other device states such as adjustable day-lighting reflector panels, heating/cooling/ventilation equipment settings, or interior electrical lighting levels.

BRIEF DESCRIPTION OF THE DRAWINGS

FIG. 1A is a schematic diagram illustrating major components of a shade control system according to one embodiment of the invention.

FIG. 1B is a schematic diagram illustrating an exterior photosensor arrangement for differential detection of sky condition according to an embodiment of the invention.

DETAILED DESCRIPTION

Figure 2:
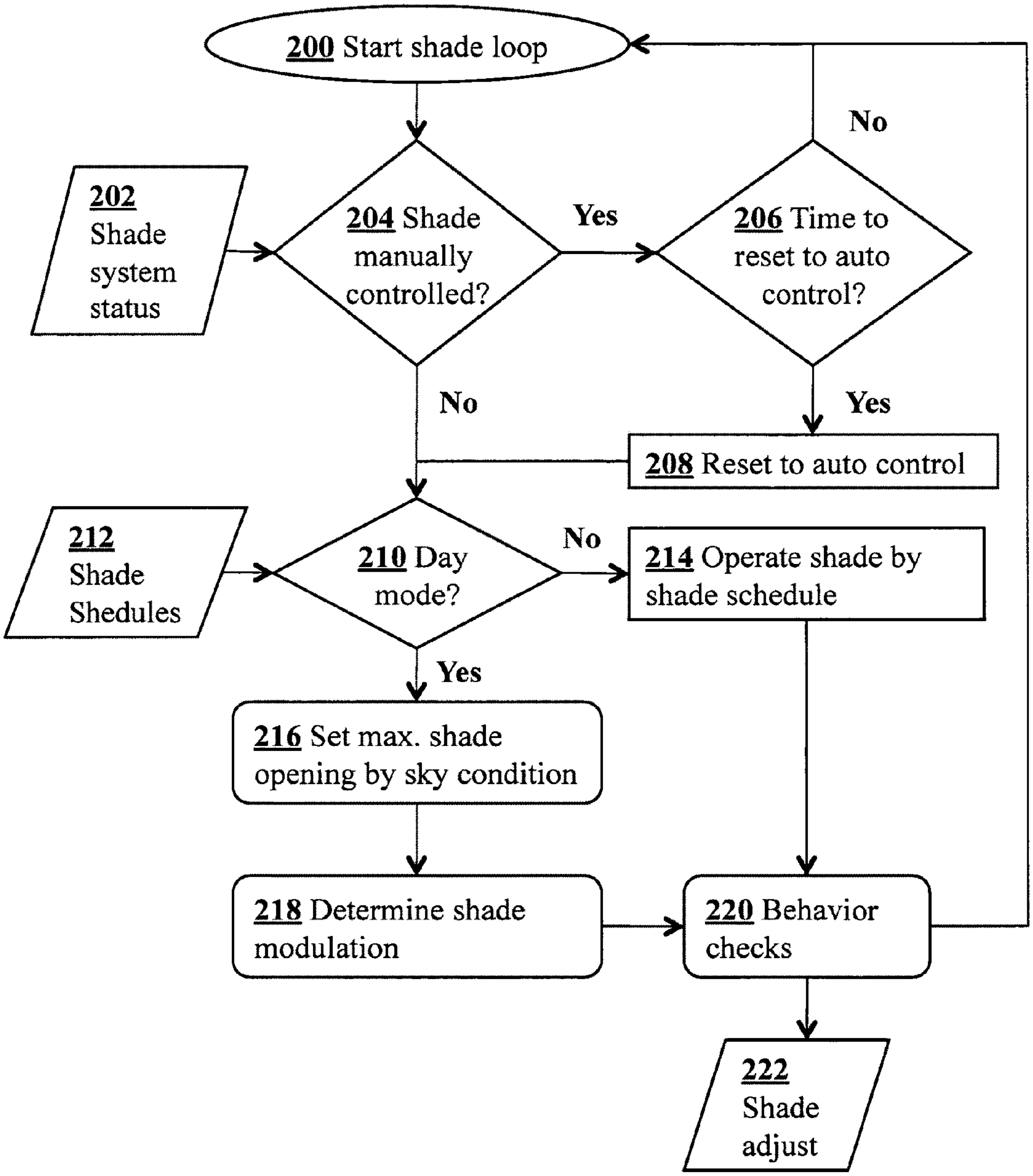
FIG. 2 is a flowchart of the main steps of a shade control logic loop according to one embodiment of the invention.

In a preferred embodiment of the present invention, automatic shading adjustment is provided for a shading zone, i.e., a room or portion of a room that has one or more similar windows (similar being similar size, sill height, orientation, glazing type, shade type, exterior obstructions, and whose shades are controlled from the same keypads or other controls) that are associated with a single interior illumination sensor for control purposes. As many zones as needed can be defined. Shade zones may or may not be coincident with electric lighting or daylighting zones. Multiple zones and shades can be handled by cycling through each of the shade zones sequentially. During each cycle, the shades in each shade zone are moved to a calculated shade position that balances a set of criteria. In one alternative these cycles follow immediately one after the other, while in another alternative the cycles happen at regular intervals. These intervals could be fixed or could vary by time of day, such as more frequently during daytime and less frequently at night, or more frequently during periods of occupancy. For simplicity of description, and without loss of generality, the following description will focus on control of a single shade in a single zone.

FIG. 1A is a schematic diagram of the major components of a shade control system according to one embodiment of the invention. This description will focus first on shading control for times when heating is not needed. A set of light sensors 100 include external sensors that read the amount of light from the exterior of the building in which the room is located. These sensors are used to determine sky condition, i.e., whether sunny or cloudy. In addition, sensors 100 also include interior sensors used to determine the amount of daylight within the room. Shade control logic processor 102 uses data from the sensors 100, shade schedule or shade function 104, and information about the shade system 108 to determine how the shades should be controlled. Shade schedules 104 are specific to each window or group of windows and are developed using the window and building geometry and orientation, building location, and exterior features and obstructions. The schedules include the shade configuration needed to block direct sun by hour and day. The hardware abstraction component 106 allows the shade control logic 102 to be implemented on a variety of shade system hardware. Shade hardware and its controller 108 can be a standalone shade and controller or a larger building automation and control system. This component may be a 3rd party system with external control capability.

Sensors 100 include a direct sun sensor array comprised of multiple sensors that gather data from different parts of the sky dome. For example, LiCor LI-210SZ sensors may be used or other cloud cover sensors or radiometers. This array is used to determine the sky condition (cloudy or clear) using a differential algorithm. In one implementation design four sensors are mounted with one sensor aimed towards each of the four cardinal directions, as shown in FIG. 1B where sensor 150 for example is oriented toward the east and sensor 152 is oriented to the south. These could be mounted as a single assembly on the roof of the building. In another design, individual sensors are mounted in four separate upper story windows facing each of the four cardinal directions. In yet another design, one or more charged coupled devices (CCDs) take pictures of a sky dome with the use of a fisheye lens. These pictures may then be analyzed to identify patterns of overcast, clear, or partly cloudy sky conditions. In another design, a rotating shadow-band photosensor can compare illuminance levels between exposed and shielded states. The photosensor (or mirror) can be rotated to gather light from different directions.

The sensors 100 also include interior sensors located inside the building such that substantially all of the light reaching each sensor is coming directly through the window or windows of that sensor's shading zone with little or no contribution from electric lighting. Such sensors may be mounted on ceilings or high on walls.

The system also has the potential to be adapted to take in additional information to act on such as rain, wind, acoustic separation, and others.

Both the exterior and interior illuminance sensors 100 are preferably calibrated upon installation and as part of a periodic maintenance program. This procedure allows the readings from the sensors to be corrected for equipment wear, drift, changing obstruction conditions, and other factors.

Shade control logic processor 102 is provided to execute routines to gather and analyze to information from sensors 100, the shade schedules memory 104 and the shade system 108 (via hardware abstraction interface 106). Processor 102 then determines whether and how to modulate the shades. FIG. 2 is an overview of a primary shade control logic loop according to one embodiment of the invention. The loop begins at step 200. Information 202 about the system status including the state of manual keypads is used in step 204 to determine whether the shade in question has been manually operated since the last cycle through the loop. If the shade has been manually operated a check is made in step 206 as to whether it is time to reset the shade zone back to automatic control. Resetting could be performed at preset times of the day. It could also be reset after a specified interval has elapsed since the manual control was started. If it is not time to reset the loop returns to step 200, otherwise the shade is reset to automatic control in step 208. When in automatic mode the decision step 210 determines whether to operate in daytime or nighttime mode. This is accomplished by referencing the shade schedule data 212 using the current time of day and day of the year. If it is night then the shade is operated by the shade schedule alone as shown in step 214. The shade schedule will specify whether the shades should be opened or closed at night. Closing shades at night will increase the overall interior reflectivity of the space, making the electric lighting more effective. It may also reduce heat loss/gain through the window if the shade device has appreciable thermal resistance. There are times of the year, though, when it might be desirable for the shades to be open, such as during warm periods when natural ventilation is used at night to cool the building (night flush cooling with natural ventilation).

Not shown on this diagram is logic to operate the shades for daylighting only when the space is occupied, based on the use of occupancy sensors (a common commercially available sensor for use with building lighting and HVAC systems). If the electric lights are controlled by occupancy and in the case where the space is not occupied (and hasn't been for a predetermined amount of time, the shades would be fully closed to reduce solar gain. The shading system would either have its own occupancy sensors or receive this information from the electric lighting control system. It is also possible to reference an occupancy schedule which, for example, operates the shade only during working days and business hours.

When the system is operating in daytime mode step 216 determines the maximum allowable shade opening based on sky condition. Further details of this step will be described below in relation to FIG. 3. Step 218 determines how to modulate the shades, as will be described below in relation to FIG. 5. Next, in step 220, the desired shade modulation is analyzed to make sure that it would not cause undesirable shade behavior and, if so, the behavior remedied. This step will be described in more detail below in relation to FIG. 6. Shade adjustment data 222 is then sent to the shades and control returns to the start 200 of the loop.

Figure 3:
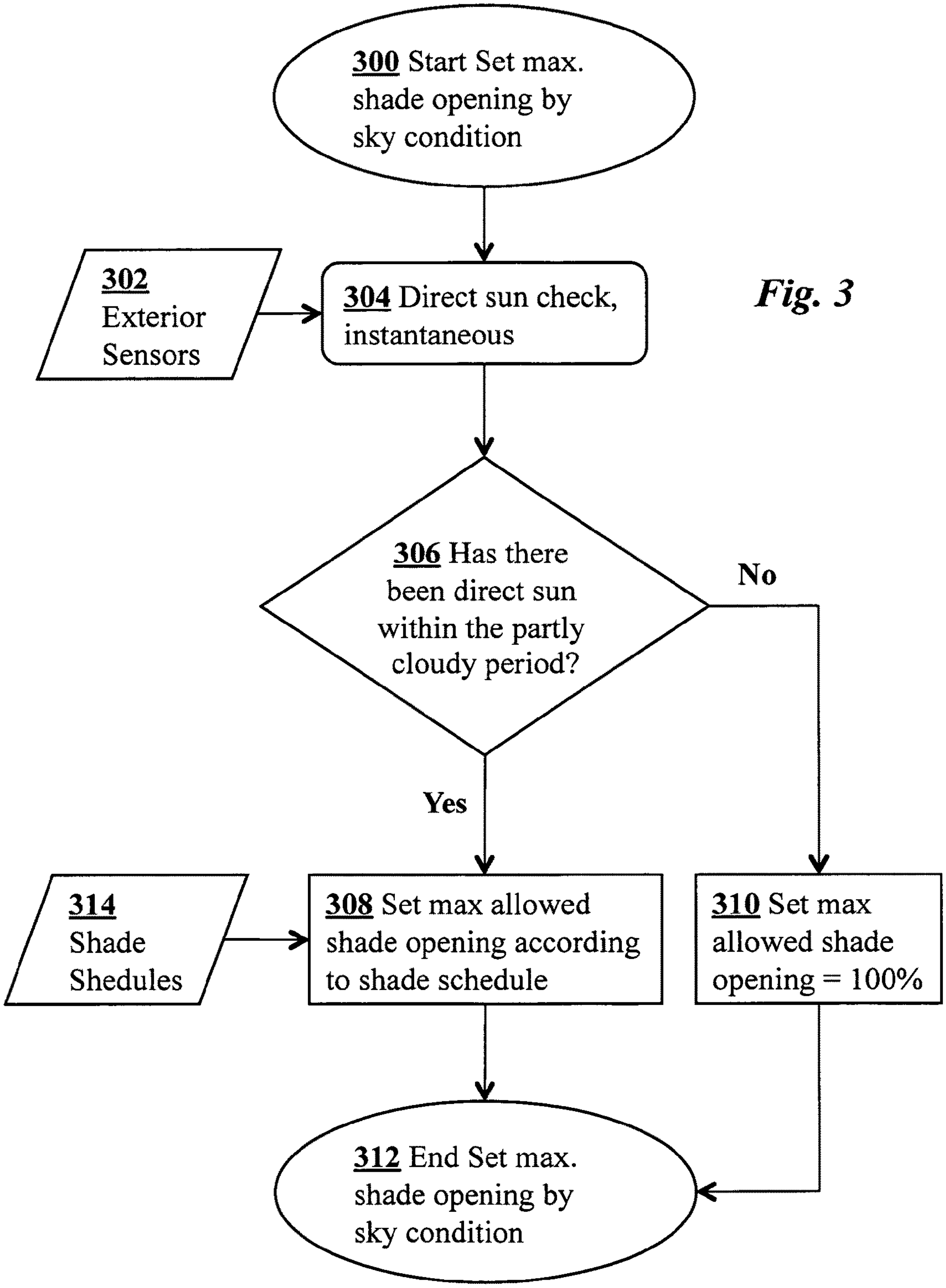
FIG. 3 is a flowchart of the details of a routine to set a maximum shade opening based on the sky condition according to an embodiment of the invention.

FIG. 3 is a flowchart of the details of step 216 of FIG. 2 which sets the maximum shade opening according to the sky condition. Control starts at step 300. Current data 302 from one or more exterior sensors are used in step 304 to determine whether there is direct sun or overcast conditions. This step will be described in further detail below in relation to FIG. 4. It is desirable to prevent excessive shade movement during partly cloudy conditions. Accordingly, a delay is built into the logic when switching between clear and overcast operation. Results from the direct sun check 304 are recorded. Step 306 checks if there has been direct sun anytime within a preset period of time. If so, the shade is operated for a clear condition in step 308 by setting the maximum allowed opening by the shade schedule 314. If it has been longer than the preset cloudy delay since skies were recorded as being clear then step 310 operates the shade for cloudy conditions in which the maximum allowed shade opening is 100%. In either case, the process ends at step 312.

Figure 4:
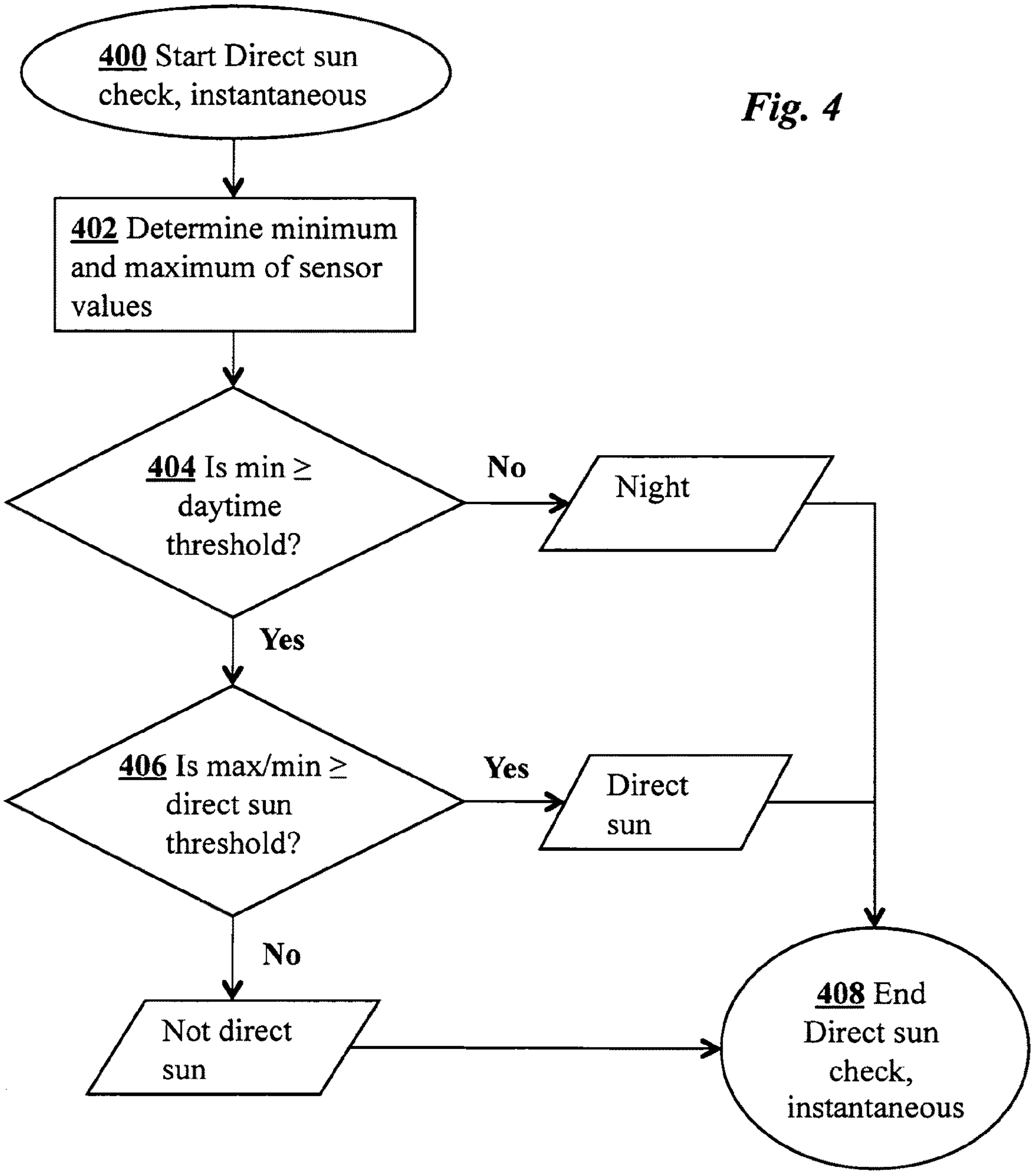
FIG. 4 is a flowchart of the details of a routine to determine a current sky condition according to an embodiment of the invention.

FIG. 4 is a flowchart of the details of the direct sun check step 304 of FIG. 3. Control begins at step 400. The minimum and maximum of the sensor values are calculated in step 402, then the minimum is compared to a threshold for daytime illumination in step 404. More generally, the sky condition may be calculated by differential comparison of the south, east, west, and north sensor levels. For example, at noon on a sunny day at typical latitudes in the northern hemisphere, the level of the north facing sensor will be less than half of the south facing sensor. Thus, direct sunlight condition can be inferred if the minimum sensor level is less than half of the maximum sensor value at any point in time. This can be adapted to site-specific conditions using the solar schedule. Adaption for the southern hemisphere is obtained by reversing the roles of north and south sensor levels. The direct sun sensing logic may also be adapted to account for exterior sunlight obstructions such as buildings, trees, or mountains. Note that this step is unnecessary when the shade schedules are available to determine daytime vs. nighttime, but it provides the flexibility to run without schedules. If schedules are available, the daytime or nighttime state is directly determined from the schedule and clock. In step 406 the ratio of the maximum to minimum is compared to a direct sun threshold value. When the ratio is larger than the threshold, the sky is considered sunny (i.e., a "direct sun" state), while when the ratio is less than the threshold, the sky is considered overcast (i.e., a "no direct sun" state). Control ends at step 408. The current sky condition information is recorded and used as described earlier in relation to FIG. 3 to identify overcast conditions that occur during partly cloudy conditions. Such conditions may be undesirable if the shades rapidly change between sunny and overcast and thus present a distraction to occupants.

The partly cloudy delay is set to avoid distracting shade movement while making sure that direct sun is always blocked. If there has been direct sun within the delay time, the maximum allowed shade opening is set to block direct sun in step 308 according to the shade schedule 314, otherwise in step 310 the shades are operated for overcast conditions by setting the maximum allowed opening to be 100% or fully open.

Figure 5:
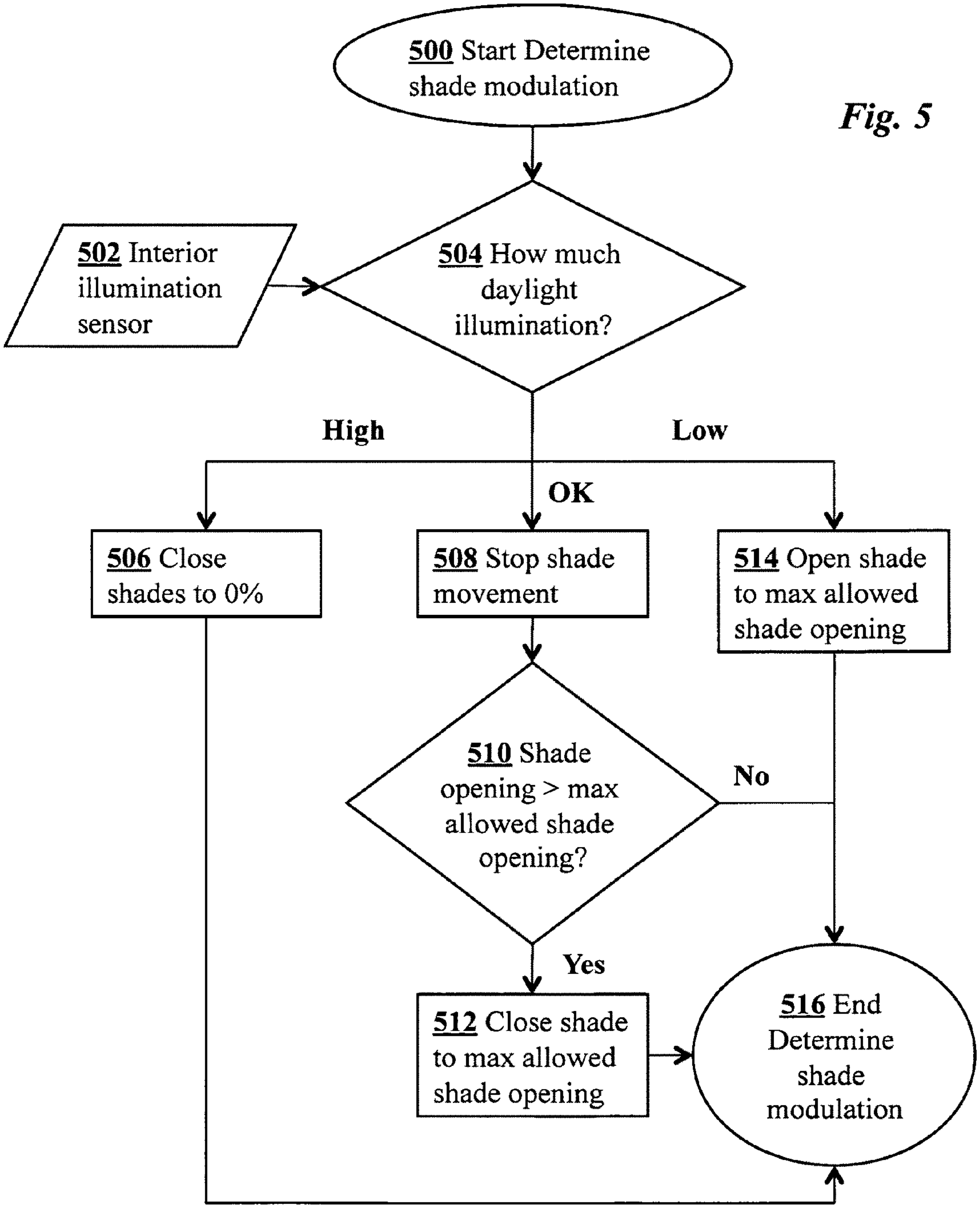
FIG. 5 is a flowchart of the details of a routine to determine a shade modulation according to an embodiment of the invention.

FIG. 5 is a flowchart of the details of step 218 of FIG. 2 which determine how to modulate the shades. Control begins in step 500. A current sensor value 502 for the interior daylight illumination is used in step 504 to determine whether the amount of daylight is within the target daylight range (i.e., OK), above the target daylight range (i.e., High), or below the target daylight range (i.e., Low). These target levels are preferably calibrated when the system is installed to illumination levels at the desired location within the space. If there is too much daylight the shades are closed in step 506. If the amount of daylight is within the target range, the shade movement is stopped 508, and then a check is made in step 510 as to whether the shade opening is greater than the maximum allowed shade opening. This case may occur if conditions go from overcast to sunny on successive shade loop cycles. When this is true the shades are closed in step 512 to the level that blocks direct sun. If step 504 determines that there is not enough daylight, the shades are opened in step 514, limited by the maximum allowed opening level. The process ends at step 516.

One option which may be implemented in some embodiments is to move shades by small incremental amounts rather than using the "guess and correct" method described above. The technique described above decides which direction the shade needs to move, tells the shade to start moving, and then catches the shade on the next cycle to decide again whether to continue movement, stop, or reverse direction. This approach may overshoot the target daylighting level. One way to avoid overshooting is to tell the shade to move in very small increments, so small that the shade movement is imperceptible between successive cycles. While there are some cases where it is desirable to immediately move the shade to a desired position, such as blocking direct sun when the shade is open too far, in other cases it is more important to avoid the potential for oscillation; using small incremental movements to eliminate oscillation would be desirable, as discussed below.

Figure 6:
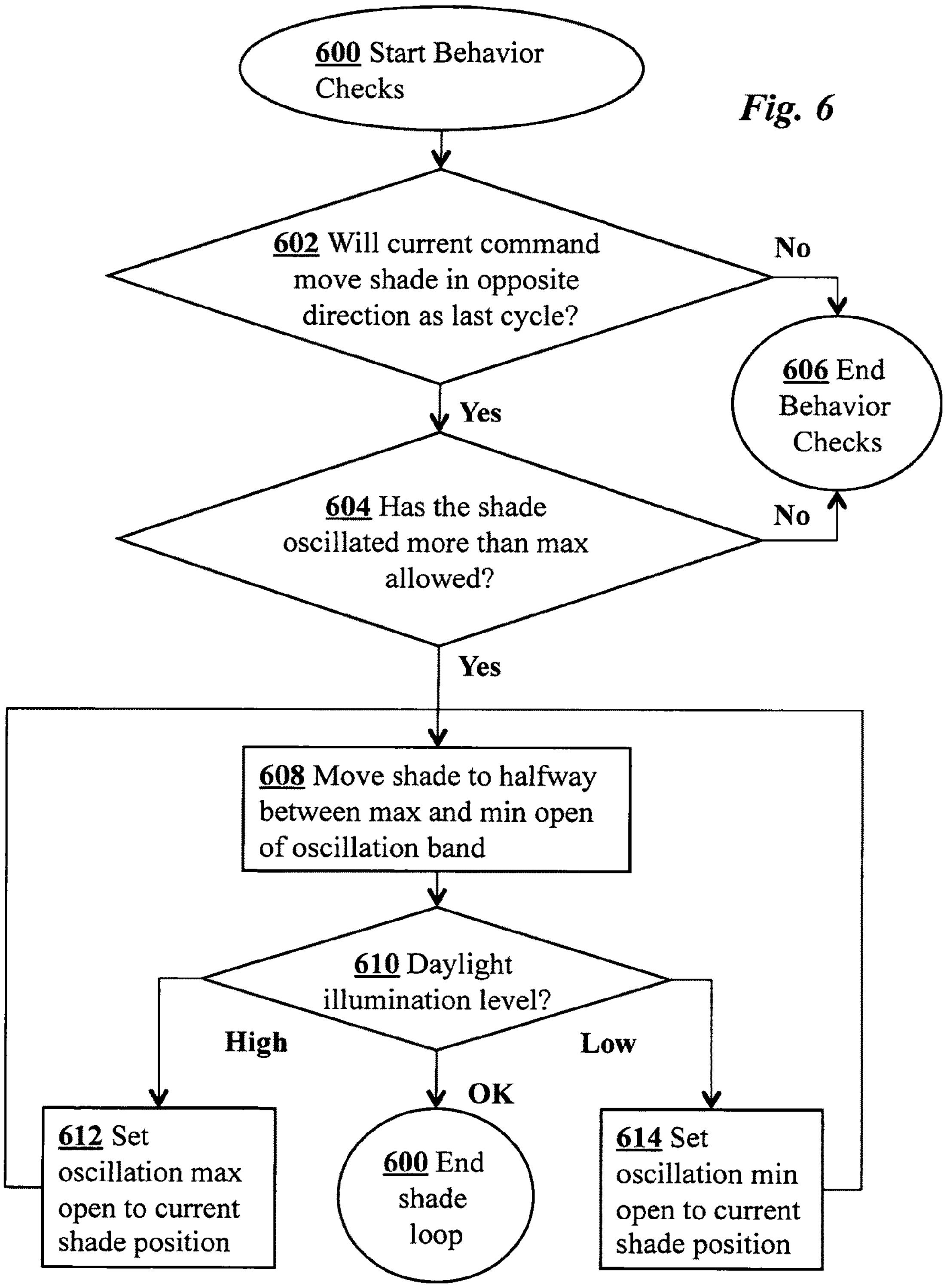
FIG. 6 is a flowchart of the details of a routine to perform shade oscillation behavior checks according to an embodiment of the invention.

FIG. 6 is a flowchart of the details of step 220 of FIG. 2 which performs a behavior check that analyzes the desired shade modulation to make sure that it would not cause undesirable shade behavior and, if so, remedy the behavior. Control begins at step 600. In step 602 the pending command is checked against the command issued in the previous cycle. If the pending command will move the shades in the opposite direction as in the previous cycle then this is noted and step 604 then checks whether the shade will have changed direction on successive cycles a preset number of times, e.g., three times. If the answer to either of the previous two checks is no then the behavior check is exited in step 606 to continue with the remainder of the main shade loop. If the shade has oscillated more than the preset number of times, then the logic enters an oscillation mode. Step 608 splits the difference between the minimum and maximum shade positions of the oscillation band. Step 610 then checks the daylight illumination level. If the level is high, then step 612 resets the maximum shade opening level to the current shade position and returns to step 608. If the level is low, then step 614 resets the minimum shade opening level to the current shade position and returns to step 608. This iterative correction continues until the daylight illumination level at step 610 is OK, at which point the shade loop is exited in step 616.

Figure 7:
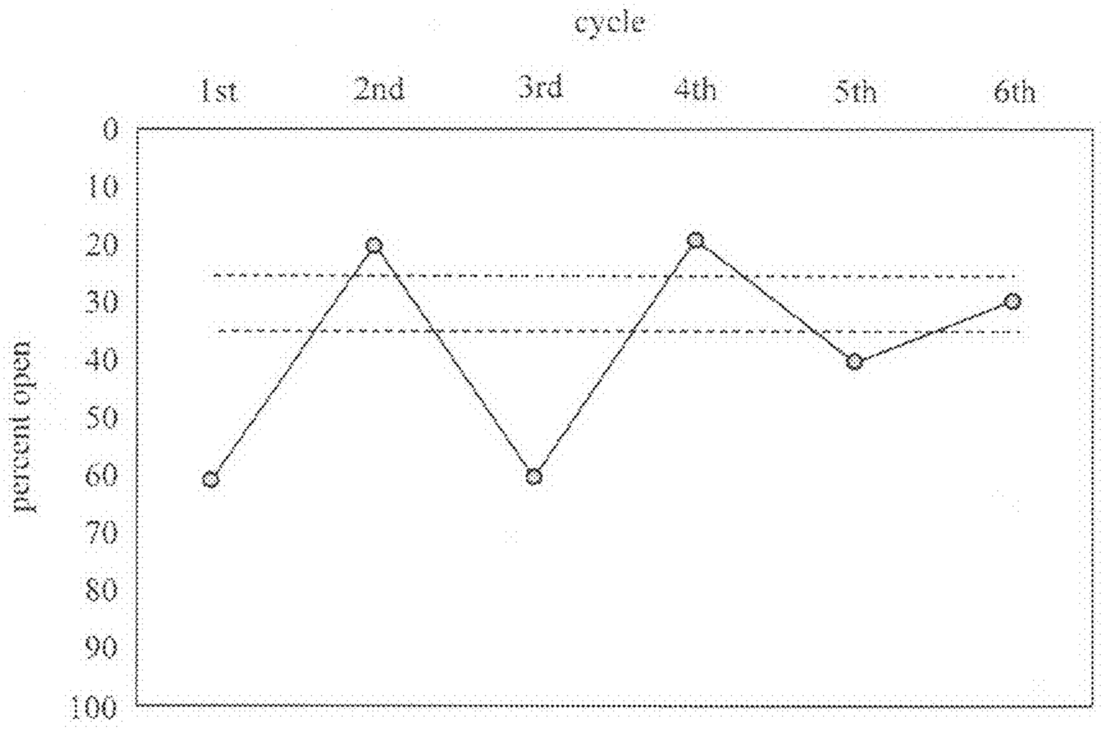
FIG. 7 is a graph of shade opening percentage vs. shade loop cycle number illustrating correction of shade oscillation according to an embodiment of the invention.

FIG. 7 is a graph of percent shade opening vs. cycle that illustrates identifying and correcting oscillation in a sequence of shade loop cycles as described above in relation to FIG. 6. The horizontal dashed lines indicate the maximum and minimum daylight illumination positions while the dots indicate successive shade positions. The positions in cycles 1-4 oscillate between opposite sides of the target daylight illumination range. After three oscillations, the correction technique is triggered. In cycle 5 the difference is split between positions of cycles 3 and 4, resulting in a position that is still on the opposite side of the target range. Thus, in cycle 6 the difference is split between positions of cycle 4 and 5, resulting in a position that is within the target range, resolving the oscillation.

The robustness of the technique may be improved with the addition of error-checking routines that check values coming from the sensors and shade system and make sure that results are valid and within acceptable ranges. If not, an error condition results and the system operator is notified. In some embodiments the system is able to make corrective decisions without input from the suspect equipment.

In some embodiments shade control may use one or more additional types of information in making decisions regarding shade adjustments. These additional types of information may include whether the window is open, wind direction and speed, precipitation, whether night flush cooling is being used, loud exterior noises, and others.

Returning to FIG. 1A, memory 104 is used to store shade schedules which describe for each window the minimum shade position needed to block direct sun from entering each window for any time of the day on any day of the year. A simple solar schedule according to an embodiment of the invention may include, for each window (or set of similar windows) solar profile angle and minimum shade height information for each day and time of day. These schedules are developed on a per project basis based on location and shade zone window orientation for specific window geometry taking into account exterior fixed shades and other exterior obstructions such as buildings, trees, and mountains. A different schedule is preferably used for each window with significantly different shading needs. The schedules can be developed for various sets of time periods. For example, a schedule for a single day can be used throughout a given month and may include hourly values for the percent open position for the shade to just block direct sun. The percent open values can include an additional margin of coverage to prevent the shade position from changing frequently, thereby reducing distraction to occupants but still consistently blocking the direct sun.

In some embodiments, an algorithm and software produce a shade schedule based on the required inputs noted above. This could be implemented either as a preprocessor step that provides tables to load into the system or as part of the system to calculate values on-the-fly.

Hardware abstraction interface 106 is used to handle communications between the shade control logic processor 102 and the actual shade system 108. The purpose of including such an interface layer is to facilitate use with different 3rd party shade hardware systems 108. Generic shade control logic 102 is then able to be used without modification in combination with various different shade systems 108. Customization is isolated to the hardware abstraction interface 106. As an illustration, the following description will use as an example a motorized shade and shade control system called HomeWorks® manufactured by Lutron Electronics, Inc. The hardware abstraction layer 106 contains specifics for interfacing with the Lutron equipment.

The hardware abstraction layer 106 can query to hardware shade system for status and other information. It can also issue commands to the hardware shade system. The queries to the shade system are used to gather information needed for the shade control logic to make decisions. For example, the Request Dimming Level (RDL) query can be used to ask the shade system 108 how open a shade is. A response is generated by the shade system 108 which is then parsed by the hardware abstraction interface 106. Sensors 100 may be connected to a data logger which for convenience can be routed through the shade system 108. To retrieve data from the data logger the Contact Closure Input Status (CCISTAT) query command can be used. The Keypad Button Press (KBP) and Request Keypad Last Button Pressed (RKLBP) query commands can be used to determine whether a shade has been manually operated.

A second task of the hardware abstraction layer is to issue commands to the shade system. In our implementation we use the Fade Dimmer (FADEDIM) command to tell the shades to move and the Stop Dimmer (STOPDIM) command to stop shade movement.

The hardware abstraction component handles timing issues in interfacing the control logic to the shade system. Many factors determine how long it takes for the shade control logic to make a cycle through all shade zones, including how many shades and shade zones there are, the speed of the shade motors, the speed of the communications between the shade system and the shade control logic, and other factors. In some implementations the hardware abstraction interface is briefly paused after issuing a query in order to avoid sending successive queries before receiving a response to an earlier query. Additionally, other pauses may be inserted to avoid various timing issues. It is likely that such pauses and delays may be needed in adapting the hardware abstraction component for any hardware shade system.

In a simple embodiment, the shade system 108 is a motorized shade with a motor and a microcontroller to drive the motor. A more complex shade system could include multiple shades, keypads, and related hardware interconnected and managed by one or more central processors. These more complex systems may also be controlling electric lighting systems. The control logic is not dependent on a particular type or make of shade system.

In one implementation, the shade system 108 includes a HomeWorks® processor, Sivoia® shade system, and related hardware such as keypads and communications devices, all manufactured by Lutron. In addition, Lutron's Home Works Illumination software is used to setup the hardware system. The hardware system need not control electric lights.

In some embodiments the shade control logic is designed to perform shade control based on solar heat gain criteria. For example, a design criterion may be to maximize solar gain through windows during those times of the year when the building is being mechanically heated. The algorithms make decisions about when to open the shades for solar gain and when to prioritize operation for other criteria such as daylighting and glare mitigation. The algorithms also close shades for additional insulation when conduction losses through the window likely exceed solar gain. These techniques involve collecting additional information through sensors such as temperature sensors and possibly gathering weather forecasts from the internet. The system may also interface with HVAC controls to determine when the building is in heating mode.

In some embodiments, shade control logic algorithms are designed to perform shade control based on daylighting criteria, e.g., optimizing daylighting levels for a task/ambient lighting strategy. This strategy entails lighting all of a space to the minimum needed for ambient lighting needs, such as navigation, and using task lighting (desk lamps, etc.) to provide higher light levels only where needed. The advantage of this strategy is that the whole space is not unnecessarily lit artificially to what is typically a much higher level, thus wasting electrical energy. The strategy is to have a variable daylighting target such that when there is enough daylight resource available the shades are operated to provide a task level of light, otherwise the target would be a lower ambient or navigation level. The algorithm considers the undesirable heat gain of using a higher daylight target and makes a tradeoff calculation.

Other possible embodiments include designing the shade control responsive to criteria that take into account mass cooling with ventilation through windows, and providing acoustic curtains.

A preferred embodiment of the shade control system enjoys the advantage that it responds to current sky conditions. This is important throughout climates that experience significant fluctuating hours of both clear and cloudy sky conditions. Most existing automated shade systems, even those capable of solar-angle/time-clock programming, unnecessarily shade cloudy skies because they use a solar gain calculation rather than an illumination calculation. Consequently, they miss the excellent daylighting opportunity that cloudy skies offer, and they unnecessarily increase electric lighting energy use.

A preferred embodiment of the shade control system has a differential exterior illumination algorithm for sky condition. The system utilizes a more advanced system for sensing the presence of direct sun. Rather than using photosensors or radiometers with a simple threshold method to predict direct sun presence, embodiments of the present invention use sensors in each cardinal direction and differential logic to determine whether the sky condition is overcast or clear.

Preferred embodiments of the shade control system modulate shades to provide "just right" daylighting. The system may be programmed to target a specific range of desired interior ambient illuminance. Additionally, the system may vary the target based on factors such as whether the building is in heating or cooling mode (e.g., winter vs. summer operation). Prior methods which attempt to maximize diffuse daylight entry result in excessive light and commensurate heat gain at times. In contrast, embodiments of the present invention modulate the shade to ensure no more daylight (and consequent heat) enters than is desired. Also, while the system is independent of electric lights, in some embodiments an interior photosensor may be used to ensure that the shade is not closed as a result of excessive daylight if the electric lights are on.

Commercial uses of shade control systems embodying the present invention may include any building of any size or type that uses electric lighting and has windows or skylights.

The interior room-illuminance photosensor is preferably designed and positioned in a way that it primarily senses exterior daylight and receives minimal light from electrical lights inside. There are several potential locations and configurations that may achieve this. In one implementation a simple box is positioned to collect primarily daylight with an illuminance sensor mounted to "see" the back of the box. For a commercializable system the sensor will preferably "see" daylight, not see significant quantities of electric light, not be subject to obstruction by occupants, and provide consistent results across a range of changing exterior obstruction and ground reflectance conditions.

There are conditions where the logic to evaluate the sky condition might need to be adapted. For instance, a shorter building in an urban setting that has tall buildings on 3 sides might receive strong light from the sun reflecting from an adjacent building while another adjacent building obstructs the direct sunlight. Without customization of the sky condition logic, it is conceivable that this unusual situation could cause the maximum to minimum ratio calculation to trigger a direct sun condition. At the same time, the shade schedule would cause the shades on the opposite side of the building from the strong reflected light to close to block the sun, while the windows receiving the reflected light would not be closed. To prevent this type of behavior, customized adjustments to the logic may be made to correctly identify this situation and operate shades appropriately.

A similar type of situation might be possible where a large obstruction (e.g., building or tree) blocks enough of one sensor's view of the sky to trigger a false determination of sunny conditions on an overcast day. If this was found to be a problem, an adapted algorithm or calibration procedure can be used to account for the obstruction.

While the above embodiments are described primarily for the case of bottom-up roller shades, the techniques of the present invention are generally applicable to a wide range of operable shade types including louvered shades, roller shades, and light shelves. It is also adaptable to various climates with a need to either increase or decrease solar heat gains at different times of the year.

Figure 8A:
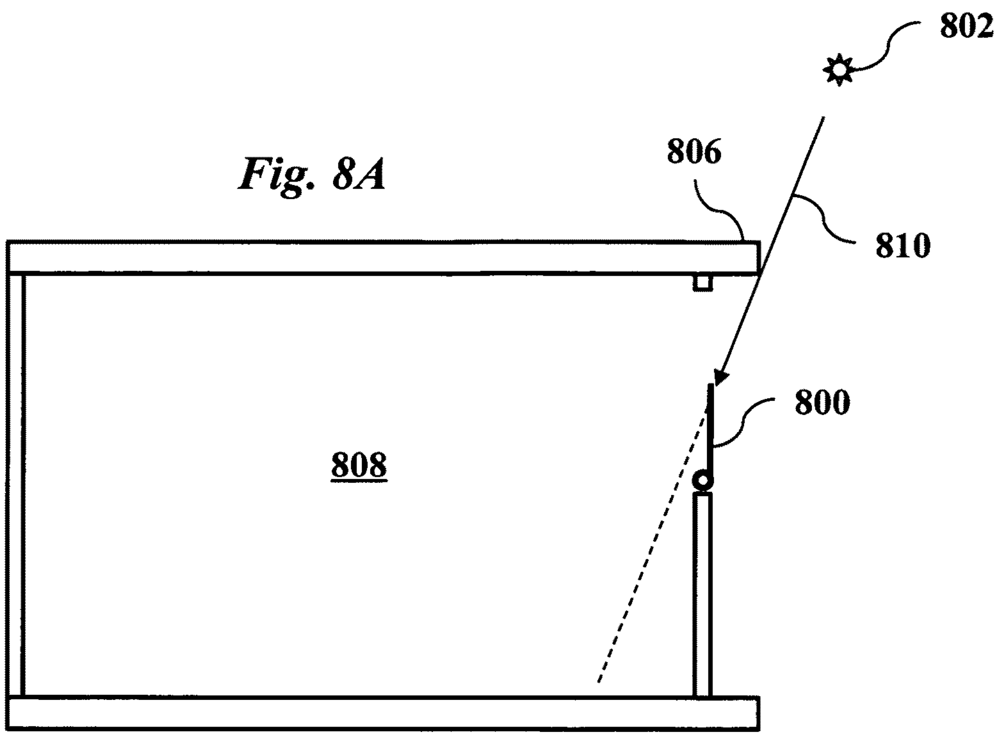
FIGS. 8A-B are cross-sectional diagrams illustrating shade positions corresponding to different angles of incident direct sun light according to an embodiment of the invention.
Figure 8B:
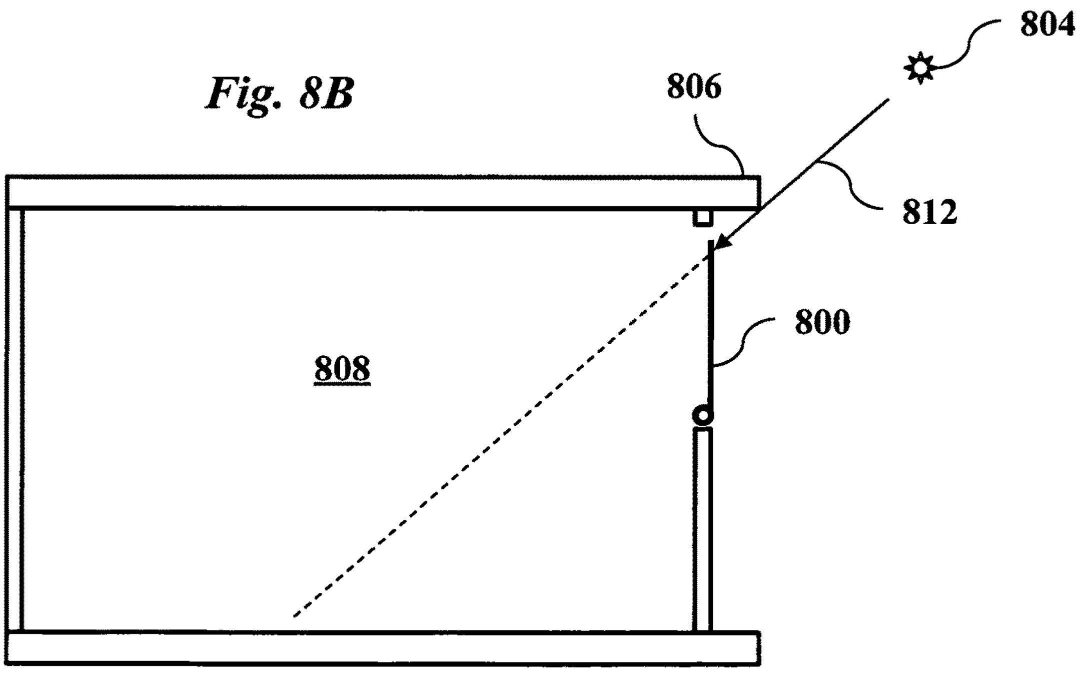

Implementations of the system may also combine the use of internal bottom-up roller shades with an exterior horizontal overhang, thereby allowing direct sun to be blocked without completely closing the shade. For example, FIGS. 8A-B illustrate two positions of a bottom-up roller shade 800 deployed on a window to a room 808 with an external horizontal overhang 806. Because of the overhang 806, when the sun position 802 is high, the direct sun ray 810 can be blocked even with the shade half open. As the sun moves to a position 804 that is lower, the shade is raised to block the direct sun ray 812, but is still slightly open. Taking advantage of external overhangs in this way relies on a solar time-clock and knowledge of the orientation and geometry of the window. It increases daylighting and allows decreased electric lighting usage during sunny sky conditions when the shades would normally be closed. It also allows for the ability to modulate the shade position to prevent excessive daylighting (defined by a maximum interior illuminance target) and to avoid unwanted solar heat gain. Therefore the combined function of the control system is to adjust bottom-up motorized shades to block only direct sun when sunny, and maintain an interior target illumination (both minimum and maximum) during both overcast and sunny periods in order to maximize energy savings from daylighting controls on electric lights.

Embodiments of the system may be designed to respond to manual overrides by occupants and revert to automated control at a specified time. While the shade control system is independent of electric lighting controls, a check is provided to prevent the shade from unnecessarily closing while electric lights are on. Additionally, the shade cloth is preferably selected to allow diffuse light transmission but not specular transmission (~6-8% visible transmission) so that some daylighting is supplied through the shade material with a minimum risk of glare.

In some embodiments, the performance goals of the shade control system can be summarized as follows:

Detect and respond as appropriate for either clear sky or overcast sky conditions and for window orientation.

During direct sun events, deploy the shade at a minimum level to block direct sun entry.

Modulate the shade to achieve targeted interior illuminance levels as much as possible, including preventing excessive daylighting.

Provide a shade cloth which allows diffuse light transmission but not specular light transmission so that some daylight transfer occurs but no view of the sun disk, thus minimizing glare.

Minimize shade movement to reduce the potential for visual distraction to occupants.

During sunny skies the shade is deployed to a minimum point to block direct sun entry and during cloudy skies the shade is adjusted to achieve targeted interior light levels. Existing automated shade systems, even those capable of solar-angle/time-clock programming, often unnecessarily shade cloudy skies. This eliminates the excellent daylighting opportunity that cloudy skies offer, and increases electric lighting energy use. This is important in locations throughout the US which experience significant and fluctuating hours of both sunny and cloudy sky conditions (see diagram at right).

The system smoothly transitions between times of electric lighting and daylighting while maintaining a steady range of interior lighting levels. It is anticipated that this will allow occupants to intuitively sense outdoor weather conditions, as the shade subtly deploys and retracts in response to sun and cloud conditions. Yet the discomfort of glare and distraction of abrupt shade movements are mitigated, increasing occupant comfort and productivity.

The following narrative description provides an example of the operation of an embodiment of the invention deployed in a specific building. This is provided for the purposes of illustrating the operation and use of a shade control system according to an embodiment of the invention. At approximately one hour before sunrise, the shades, which have been shut through the night, will open 100%. When the first occupant enters the room during daylight hours in the morning, the shades will already be deployed to the appropriate level: either fully open, or deployed to the appropriate level to block direct sun or maintain the maximum ambient light level. From this point, if daylight continues to increase in excess of desired ambient lighting levels, the shade will begin to deploy to maintain an ambient light level within a desired range. If direct sun is perceived by the exterior photosensors at any time, the shade will deploy immediately to the minimum point necessary to block direct sun from the space. Depending on the orientation of the window and the presence of an external overhang, this may allow a portion of the window to remain unshaded, increasing daylighting by viewing the clear, blue sky. During partly cloudy conditions, the shade will alternately open to the minimum level to block direct sun or, when a cloud obscures the sun, to the optimum level for daylighting. A time delay may be used to prevent disruptive oscillation. If at any point the user so desires, they may use a keypad to override the automatic control and open or close the shade the desired amount (It is recommended that a switch be provided to control each "bay" separately). This manual override will be maintained until midnight, at which time the system will revert to automatic control. After sunset, the shades will continue normal operation for approximately one hour, at which time they will close until one hour before the following sunrise. Electric lighting will operate as normal. If a shade has been manually controlled that day, it will remain at the last manually ordered setting until midnight, at which time it will revert to automatic operation and close.

Note that this shading system does not directly communicate with the electric lighting system. The systems use separate photosensors which are calibrated so that the electric lights are turned off before the shades would be deployed, and vice versa, the shades would be fully open before the electric lights would be turned on.

In some embodiments of the invention, the shade control may be based on occupancy, in addition to other factors such as daylight condition, heating/cooling mode, and solar schedule. For example, in one such embodiment, the shades are initially kept closed until occupancy is detected, e.g., by infrared or ultrasonic sensors. After the shades are modulated, the occupancy sensors may be used to determine whether the room has been occupied during a specified time interval, e.g., the past 20 minutes. If the room is not occupied, the shades can be closed and kept closed until occupancy is detected. Embodiments of the invention may also include provisions for manual over-ride of the automatic system. For example, the shades may be initially kept open until an occupant manually switches the system on.

Other embodiments of the invention may provide electric lighting control integrated with shading control. In such embodiments, shade control provides daylighting illumination levels in a desired range with electrical lighting minimized so that it is used only when daylighting from the windows is not sufficient to provide minimum desired levels of interior illumination.

The invention claimed is:

1. A method for automatic daylighting, the method comprising:

detecting an interior light illuminance level primarily due to exterior light entering a window into a room;

determining whether the room is in a heating mode;

detecting whether the room is occupied by people;

detecting whether occupants have manually operated an adjustable window covering for the window in the room;

detecting an exterior sky condition;

calculating an adjustment of the adjustable window covering, such that the adjustable window covering is modulated to i) block direct sunlight from entering the room through the window when the exterior sky condition is a sunny sky state and the room is in a cooling mode, ii) subject to satisfying (i), provides a desired daylighting interior light illuminance level through the window that is within a target daylighting range and provides a desired interior solar heat gain through the window that is within a variable target heat gain range; and automatically adjusting the adjustable window covering based on the calculated adjustment, wherein the adjusting is delayed when the estimated exterior sky condition changes from a sunny sky state to an overcast sky state.

2. The method of claim 1 wherein the calculated adjustment is calculated in dependence upon the detected interior light illuminance level, the exterior sky condition, the determined heating mode, whether the room is occupied by people, and whether occupants have manually operated the adjustable window covering.

3. The method of claim 1 further comprising detecting an interior temperature level to determine the heating mode.

4. The method of claim 1 wherein determining an estimated exterior sky condition comprises separately detecting four exterior light illuminance levels from four corresponding distinct directions, computing differentials between the four exterior light illuminance levels, and using logic to produce the estimated exterior sky condition.

5. The method of claim 1 wherein the adjustable window covering is an interior motorized bottom-up roller shade mounted on the window or skylight and having a shade cloth which allows diffuse light transmission but not specular light transmission.

6. The method of claim 1 wherein the adjustable window covering is a variable emissivity coating or electrochromic glass.

* * * * *